Nov. 17, 1942.   E. E. WALLER, SR   2,302,279
BICYCLE FORK BENDING TOOL
Filed Oct. 7, 1941

INVENTOR.
Elwood E. Waller, Sr.,
BY
Philip S. McBean.
ATTORNEY.

Patented Nov. 17, 1942

2,302,279

UNITED STATES PATENT OFFICE 2,302,279

BICYCLE FORK BENDING TOOL

Elwood E. Waller, Sr., Dunellen, N. J.

Application October 7, 1941, Serial No. 413,914

3 Claims. (Cl. 81—15)

The invention here disclosed relates to tools for bending, or as it is usually called "straightening" bicycle forks.

At present, the usual method of "truing" up the front forks of bicycles which have been bent out of shape as by collision or the like, is to remove the entire fork from the frame of the machine, take the wheel out of the fork and then after clamping the stem of the fork in a vise, slip a two inch pipe over the bent fork and use it as a lever to bend the injured fork back to the proper shape. This requires considerable time and the exercise of skill and patience and more or less injury to the part, since the pipe has a tendency to scratch and nick the enamel, paint or other finish on the fork.

Objects of the present invention are to avoid the objections noted and to provide a simple, practical, inexpensive tool by which a bicycle fork can be quickly and accurately bent to shape, without requiring removal of the fork from the machine.

Other desirable objects of the invention will appear as the specification proceeds.

The drawing accompanying and forming part of the specification illustrates one simple commercial embodiment of the invention. Structure however, may be modified and changed as regards this particular disclosure, all within the true intent and broad scope of the invention, as hereinafter defined and claimed.

Figure 3:
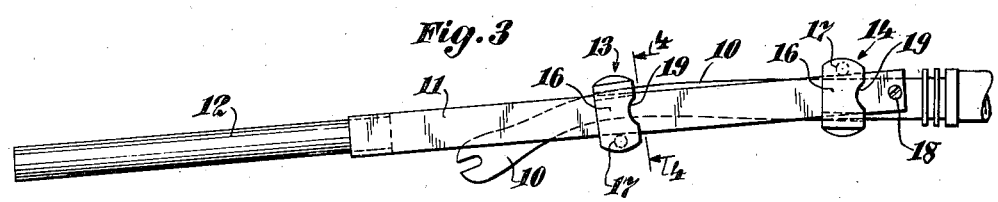
Figure 4:
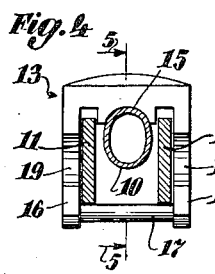
Figure 5:
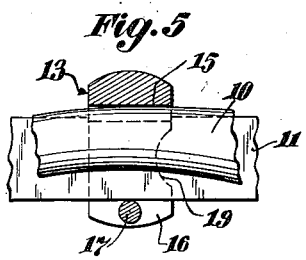

Figs. 4 and 5 are further enlarged broken sectional details as on line 4—4 of Fig. 3 and as on line 5—5 of Fig. 4, respectively.

Figure 1:
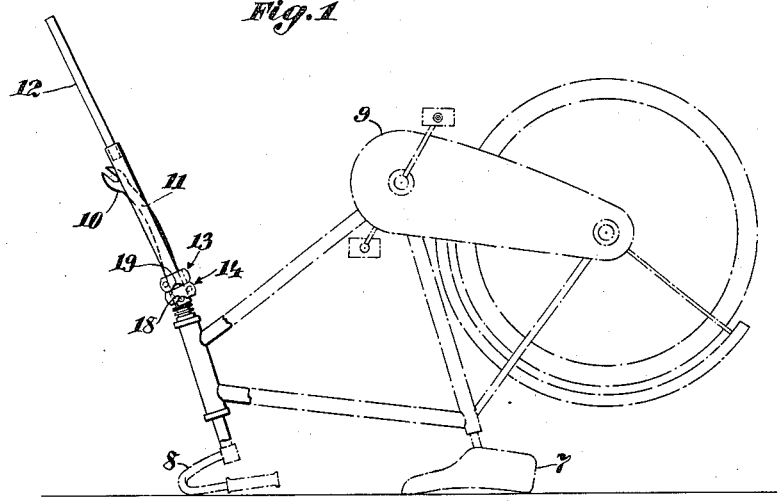
Fig. 1 is a side elevation showing the tool applied and as in use for bending the front fork of a bicycle.

Fig. 1 illustrates particularly how the tool may be used for correcting a front fork by simply turning the bicycle upside down, so that it rests on the saddle and handle bars 7, 8, in position where the operator may straddle the sprocket 9, and readily apply the bending tool to and work on the front fork 10, after removal of the front wheel.

Figure 2:
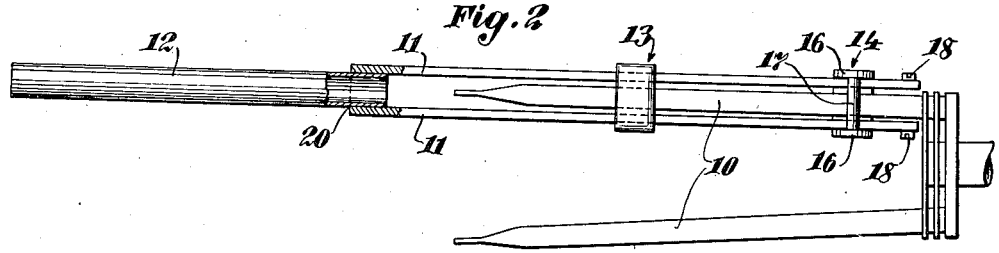
Figs. 2 and 3 are broken part sectional front and side views on a larger scale, illustrating use of the tool.

As shown more clearly in the larger views, Figs. 2 and 3, the tool is in the nature of a lever made up of substantially parallel side bars 11, 11, spaced to stand at opposite sides of a bicycle fork and having an extended handle portion 12, through which sufficient leverage is gained to effect any necessary bending of the forks.

Looped to slide over the side bars are a pair of benders 13, 14, constructed to engage opposite edge portions of a fork enclosed between the bars.

In the illustration, these benders are constructed alike, each in the nature of a stirrup having a pillow 15, at one edge concavely curved to approximately fit and form a seat for the edge of the bicycle fork and projecting side pieces 16, which embrace the sides of the side bars 11, and are connected across the opposite edges of the bars by a bolt or stud 17. The latter, in addition to slidingly confining the pillowpiece on the side bars serves as a pivot, Figs. 3 and 5, to permit the pillow block to rock one way or the other and thus more or less conform itself to the longitudinal curvature of the bicycle fork.

The benders 13, 14, are engaged over the side bars in oppositely placed relation, that is, with the pillow pieces at the opposite edges of the side bars, so that as shown in Figs. 1, 2 and 3, one bender will engage the bicycle fork at one edge and the other bender will engage the fork at the opposite edge. Being slidable, they can be set at any distances apart and so as to engage the fork at any selected points in the length of the same, thus to apply the bending, straightening or "truing" force at the point or points where needed.

To confine the benders or sliders on the side bars, abutments such as the screws 18, 18, are shown on the ends of the bars at the outer sides of the same, where they will serve as stops engageable by the side portions 16, and where they will not scratch the finish on the bicycle forks. The use of screws for abutments is of advantage in that on removal of the screws, one or both benders can be slipped off the bars and be reversed or be replaced by different forms of benders or the like.

Rounded notches 19, in the edges of the side portions of the benders may engage the abutment screws 18, and may rock over these abutments one way or the other, to permit free self-adjustment of the bender to best fit the contour of the fork.

The open skeleton form of the tool enables full view of the bending operation and hence facilitates quick, accurate, easy work. The pillow blocks of the benders are shaped to fit the fork curvature, thus to provide more or less extended engaging surface and this with the rocking and sliding adjustments of the benders, enables any necessary bending force being applied without scarring, scratching, indenting or otherwise marring the finish of the fork.

Of particular advantage, is the fact that to use the tool, it is only necessary to take off the front wheel of a bicycle, motorcycle or other machine and then the machine itself, that is, the frame and other parts, serve as a means for steadying and holding the fork, while the bending force is being applied. The bending is easily localized wherever required by locating the benders at different points along the side bars. The tool may be used to bend the forks transversely as well as in the longitudinal plane. While the body of the tool may be made in a single piece, it has been found preferable, up to the present, to construct it with the two side bars as separate lengths of metal, welded, brazed or otherwise secured to a tubular handle piece, such as illustrated.

The tool can be quickly slipped into place endwise over the fork and one or both the benders adjusted to positions to best accomplish the desired results. By removing the tool and facing it in the opposite direction, the fork can be bent the opposite way. The grip of the pillow pieces over the opposite edges of the fork is sufficient to enable the tool being used to twist the fork one way or the other and if leverage is required for applying such twisting force, the handle may have a hole through it for insertion of a bar or rod to apply a rotational twisting force. If desired, the pillow pieces may be faced with leather or other material to avoid any possibility of scratching but with the extended surface shaped to fit the fork, this usually is not considered necessary.

What is claimed is:

1. A bicycle fork bending tool, comprising bars spaced in substantially parallel relation to stand at opposite sides of a bicycle fork, handle means connecting said bars together at one end in said spaced substantially parallel relation and benders slidingly engaged on said bars and having pillows shaped and positioned to engage opposite edges of the bicycle fork, the pillow of one of said benders extending across the open space between the bars at one side of said bars and the pillow of another bender extending across the space between the bars at the opposite side of said bars.

2. A bicycle fork bending tool, comprising bars spaced in substantially parallel relation to stand at opposite sides of a bicycle fork, handle means connecting said bars together at one end in said spaced substantially parallel relation and benders slidingly engaged on said bars and having pillows shaped and positioned to engage opposite edges of the bicycle fork, said benders having free pivotal movement as well as sliding adjustment on said side bars.

3. A bicycle fork bending tool, comprising bars spaced in substantially parallel relation to stand at opposite sides of a bicycle fork, handle means connecting said bars together at one end in said spaced substantially parallel relation and benders slidingly engaged on said bars and having pillows shaped and positioned to engge opposite edges of the bicycle fork and abutment means removably retaining said sliding benders on said side bars.

ELWOOD E. WALLER, Sr.